Oct. 20, 1970     J. M. McMULLEN     3,535,630
INFRARED RADIATION TEMPERATURE SENSING USING REFLECTOR
TECHNIQUE FOR MEASURING THIN SHEET MATERIALS
Filed March 8, 1967

JAMES M. McMULLEN
INVENTOR.

BY G. Henry Peterson

AGENT

United States Patent Office 3,535,630
Patented Oct. 20, 1970

3,535,630
INFRARED RADIATION TEMPERATURE SENSING USING REFLECTOR TECHNIQUE FOR MEASURING THIN SHEET MATERIALS
James M. McMullen, Columbus, Ohio, assignor to Industrial Nucleonics Corporation, a corporation of Ohio
Filed Mar. 8, 1967, Ser. No. 621,634
Int. Cl. G01j *5/06;* G01r *27/26*
U.S. Cl. 324—61                                      10 Claims

ABSTRACT OF THE DISCLOSURE

Method and apparatus for temperature compensation of measurements of dielectric properties of thin sheet materials such as tissue paper produced by a paper-making machine. An infrared radiation sensor is positioned on one side of the sheet, to receive infrared radiation emitted by the sheet, and a reflector is positioned on the other side of the sheet opposite the sensor. Both the sensor and the reflector are supported on a traversing gauge mount, and are thus adapted to scan back and forth across the width of the sheet, or to measure at any selected point across its width. The signal output from the sensor is used to compensate a dielectric gauge, such as a paper moisture gauge, for temperature variations in the material which affect its dielectric properties.

RELATED APPLICATIONS

For background information supplementing the present disclosure, reference can be made to two commonly-assigned copending applications, Ser. No. 420,889, filed Dec. 24, 1964 by Robert V. Byrd, and Ser. No. 598,453, filed Dec. 1, 1966 by John J. Thornton et al.

BACKGROUND OF THE INVENTION

This invention relates to a method and means for sensing the temperature of bodies by detecting infrared radiation emitted from the body. Generally it relates to an arrangement in which an infrared radiation sensor is placed on one side of a traveling sheet of material for indicating the temperature of the material as a function of the infrared radiation emitted from the sheet.

The above-referenced applications describe the use of infrared radiation temperature sensors for providing an output signal which is a function of the temperature of sheet materials, such as paper which is continuously produced by a paper-making machine. The output signal from the temperature sensor is used to compensate the signal from a dielectric gauge, for example, a dielectric moisture gauge, for temperature variations in the material which affect its dielectric properties.

When the radiation sensor is used to measure thin materials such as tissue paper, the thin material is less than an "infinite radiator" for radiation emitted by the sheet according to its temperature. For convenience herein, an infinite radiator is defined as a material which emits infrared radiation according to its temperature and is of such a thickness that when it is at a constant temperature there is no substantial change in the intensity of the emitted radiation when the material thickness is increased. In the case of a material which is not of sufficient thickness to constitute an infinite radiator, the radiation emitted from the surface is not in thermal equilibrium with radiation from the underlayers of the material, so that a variable portion of the radiation emitted from the region near the surface on one side of the material escapes by penetrating through the sheet and the other surface. This loss of emission is not compensated for by emission from the underlayers as is the case with an infinite radiator. Hence if the sheet thickness changes, even though the sheet remains at constant temperature there is a change in the intensity of the emitted radiation, which produces a change in the signal from the radiation temperature sensor.

Similarly, a thin material such as tissue paper is less than an "infinite absorber" for thermal background radiation. For convenience herein, an infinite absorber is defined as a material of such a thickness that there is no substantial change in the radiation transmitted through the material when the material thickness changes. Hence in the radiation temperature measurement of such a material as tissue paper, another difficulty arises because the thermal background radiation penetrates the thin sheet and induces a spurious response from the temperature sensor. This is particularly the case when the temperature sensor is caused to scan back and forth across the width of the sheet. Under ordinary conditions, as the gauge scans back and forth, the temperature sensor successively views, through the sheet, various background objects which may have different emissivities and which may be at different temperatures. Moreover, when thickness changes, or changes in weight per unit area of the sheet occur, the changes in the amount of radiation absorbed by the sheet tend to modulate the intensity of the background radiation passing through the sheet. These factors tend to produce errors in the temperature indication provided by the sensor, thus resulting in an error in the dielectric gauge signal due to inaccurate temperature compensation.

SUMMARY OF THE INVENTION

According to the present invention, the effects of the above-described sources of error are minimized by mounting a radiation reflector, having a surface of the proper emissivity, on the other side of the sheet opposite to the temperature sensor, so as to reflect radiation emitted from the other side back through the sheet toward the sensor. Preferably, the reflector is of relatively small size, and is arranged to traverse back and forth across the width of the sheet while occupying about the same position relative to the position of the infrared radiation sensor.

The present invention has been found to be particularly useful for the measurement of continuously moving paper sheets having a weight per unit area in the range of about 1 to 3½ milligrams per square centimeter. Paper sheets heavier than about 3½ mg./cm.² generally constitute infinite radiators and infinite absorbers for thermal background radiations, and hence would not generally require the use of the reflector technique. With paper sheets lighter than about 1 mg./cm.², the reflector technique could not completely eliminate the effects of thickness variations, although it would be effective to substantially eliminate the undesirable effects of the thermal background radiations. With other materials such as plastics which have smaller absorption coefficients for infrared radiations and are therefore more "transparent" than paper, the use of the reflector technique would be needed over a considerably wider range of weights per unit area or thicknesses.

It is an object of this invention to provide an improved radiation temperature sensing method and means adapted for use on thin materials, utilizing a reflector, which makes the temperature sensing operation relatively insensitive to changes in material thickness.

It is also an object to provide an improved temperature sensor arrangement which minimizes the effect on the sensor of thermal background radiation which would otherwise penetrate the thin sheet and cause inaccurate readings.

It is another object to provide such a temperature sensor having increased sensitivity to temperature variations in the material per se.

Further objects and advantages of the present invention will become apparent in the following detailed description of a preferred procedure and arrangement for practicing the invention, taken in conjunction with the appeded drawings.

DESCRIPTION OF PREFERRED EMBODIMENT

Figure 1:
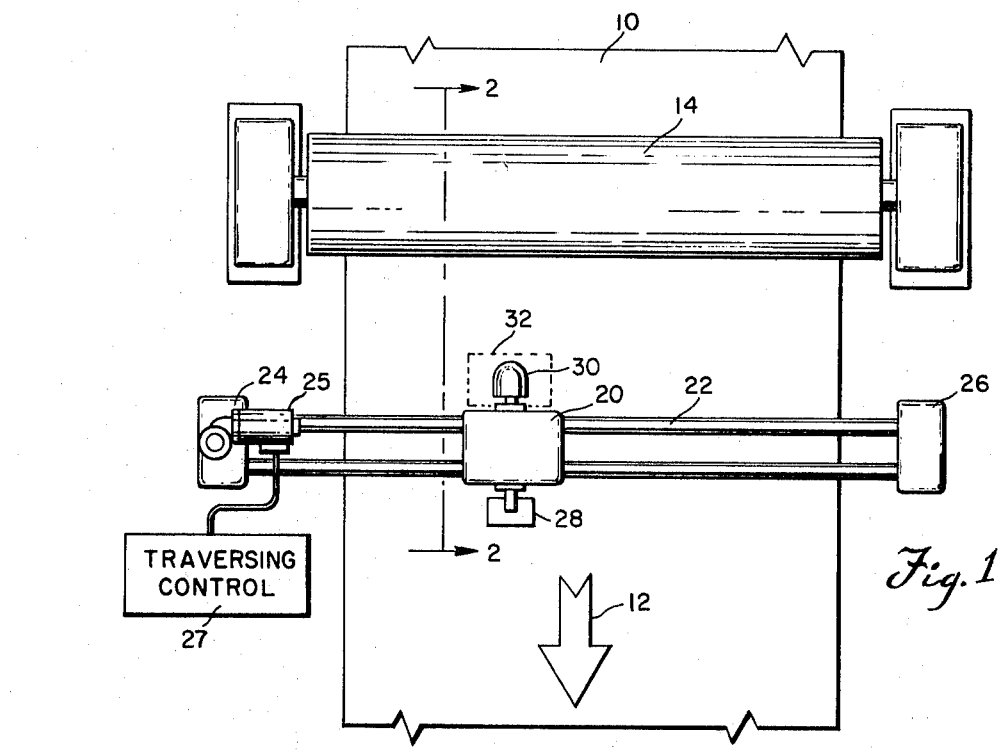
FIG. 1 is a sketch representing a plan view of a portion of a tissue paper making machine having thereon a gauging system incorporating a temperature sensing arrangement according to the present invention.
Figure 2:
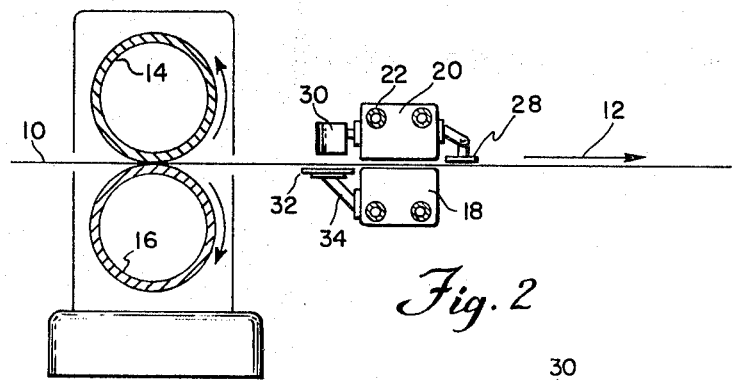
FIG. 2 is a sketch represeting a section on the line 2—2 of FIG. 1.

With reference to FIGS. 1 and 2, the numeral 10 represents a traveling sheet of tissue paper, traveling in the direction of the arrow 12. In previous sections of the paper making machine (not shown) the sheet 10 will have been formed on a Fourdrinier wire or by a cylinder machine, passed through a dryer, and perhaps subjected to a creping operation. The sheet 10 is here shown being subjected to a nominal calendering operation by passing it through a two-roll calender having a pair of spaced rolls 14 and 16 which are steam heated. It is understood that the sheet 10 could as well represent a sheet of plastic or some other material, and that the rolls 14 and 16 could as well represent the rolls of a plastics calender or other sheet-forming apparatus.

At the output of the calender is located a gauging arrangement which normally includes a beta ray gauge for measuring the "thickness," or more properly, the weight per unit area, of the tissue paper. The beta ray gauge includes a beta radiation source housing 18 and a beta ray detector hausing 20. The source and detector housings, which are located on opposite sides of the sheet 10, are adapted to traverse back and forth across the width of the sheet on four traversing support tubes as at 22 which are supported at their ends in upright stanchions 24 and 26 located beyond the lateral extremities of the path of the sheet. The traversing or scanning movement of these units is produced by a traversing motor 25 under the control of a traversing control unit 27.

Included in the gauging arrangement is a dielectric gauge probe 28 which carries spaced electrodes 28a (FIG. 3) in light physical contact with the top side of the sheet. The electrodes in the probe are enrgizd with a radio frequency voltage to produce an alternating electric field, represented by the dashed lines 29, which interacts with the dielectric material in a measured portion of the sheet. A signal, derived from the probe, which is indicative of the complex electrical admittance of the probe, is processed electronically to obtain an output signal indicative of the percentage moisture content of the tissue paper. The admittance of the probe 28 is a function of the complex dielectric constant of the moist tissue paper sheet 10. The complex dielectric constant, which in simple terms is manifested by the "resistance" and "capacitance" 'of the probe with the paper present, is in turn a function of the temperature of the paper as well as its moisture content which is to be measured. Accordingly, the dielectric gauge arrangement needs to be compensated for temperature variations in the sheet 10 which occur about a nominal temperature.

To this end, an infrared radiation temperature sensing probe 30, which is preferably of the type described in the Thornton et al. application, supra, is secured by a suitable bracket to one side of the beta ray gauge detector head 20. The probe 30 is designed to receive infrared radiation emitted by the tissue paper sheet 10 and to provide a signal indicative of its temperature.

A thin material such as tissue paper, however, is semi-transparent to the infrared radiations or "heat rays" to which the temperature sensor 30 is responsive, leading to the difficulties described above in connection with less-than-infinite radiators or absorbers. It can be said further that the sensor would ordinarily at least partially view the floor, the broke pit or other objects such as machine parts or structural members in the vicinity, since the sensor is partially looking at the sheet and partially looking through the sheet.

Therefore, according to the invention a suitable reflector plate 32 is mounted below the sheet 10 in line with the axis of the temperature sensor 30 above the sheet. The surface of the reflector facing the sheet 10 should have the lowest possible emisivity and the highest possible reflectance for the infrared radiation wavelengths involved, consistent with economic practicality and the stability of the surface characteristics under the ambient atmospheric conditions in the plant where the apparatus is used. The reflector plate 32 is preferably constructed of ordinary sheet aluminum having the usual oxidized surface which ordinarily forms naturally on the surface when a bright piece of aluminum is exposed for some time to the atmosphere. Such an oxidized aluminum surface is found to have the necessary stability and an emissivity and reflectance which is quite satisfactory for the purpose described. Other suitable materials with surfaces having satisfactory characteristics may of course be substituted for oxidized aluminum. The reflector plate is of course quite opaque to the radiations emitted by the sheet and to the background radiations, and hence is adapted to shield the sensor against thermal background radiation which would otherwise penetrate the thin sheet and affect the sensor output.

With a temperature sensor probe of the type described in the Thornton et al. application, supra, having a viewing window (not shown) of slightly less than three inches in diameter, I have successfully used an aluminum plate about six inches by eight inches in size, supported on a suitable bracket 34 attached to the beta ray gauge source housing 18. It is understood that the source housing 18 and the detector housing 20 are coupled together by a conventional arrangement designed to maintain their relative alignment while traversing back and forth across the sheet along guide tube 22. Thus when the temperature sensing probe 30 is moved from side to side across the sheet, the reflected plate 32 moves with it, so that the plate is always located directly beneath the sensor and in the same relative position.

In addition to its function of shielding the temperature sensor against background radiations which would ordinarily penetrate the sheet and affect the accuracy of the sensor output, the reflector also increases the sensitivity of the sensor to changes in the sheet temperature per se, since thermal radiations emitted from the bottom of the sheet are reflected back through the sheet to the temperature sensor, thus increasing the intensity of the infrared radiation from the sheet which is intercepted by the sensor.

Figure 3:
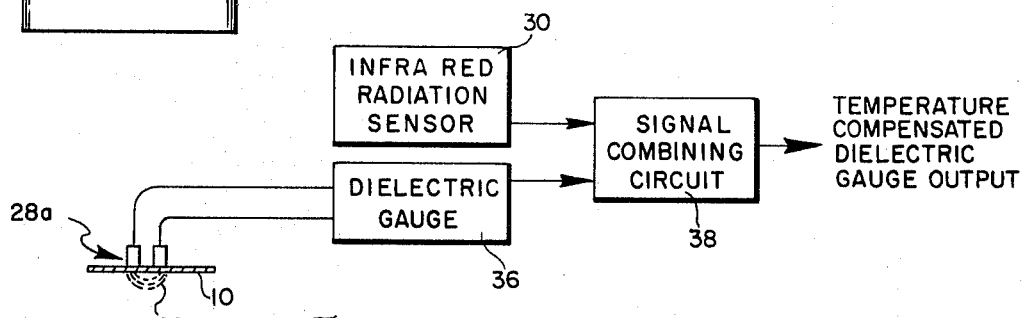
FIG. 3 is a block diagram of a dielectric gauging system whose output is compensated for temperature variations by a temperature sensor arrangement according to the present invention.

The temperature sensing arrangement with the reflector according to the invention is an essential component of a thin materials dielectric gauging system as shown in FIG. 3. Here there is shown generally a dielectric gauge 36 for measuring a property of a dielectric material. Since the dielectric properties of the material are subject to variation with changes in the temperature of the material as well as with changes in the material property such as its moisture content which is to be measured, the dielectric gauge 36 is compensated for the temperature changes by utilizing a signal from the infrared radiation sensor 30. Accordingly, the radiation sensor and the dielectric gauge outputs are connected to a suitable signal combining circuit 38 which may be of the kind which is described in detail in the Byrd application supra. The signal combining circuit 38 combines the signals from the dielectric gauge and the infrared radiation sensor to provide a dielectric gauge output signal which is compensated for variations in the temperature of the material, and hence the output of the system provides a signal indicative of the measured property of the material, substantially independent of changes in the complex dielectric constant of the material caused by temperature changes in the material.

While the invention has been shown and described as a specific procedure using specific apparatus, such showing and description is meant to be illustrative only and not restrictive, since many changes and modifications can be made.

What is claimed is:

1. The method of measuring the temperature of a traveling sheet of thin dielectric material having a thickness such that it constitutes less than an infinite radiator of the infrared radiation emitted according to the sheet temperature, said method comprising:
   reflecting infrared radiation emitted from one side of said sheet back through said sheet to combine with infrared radiation emitted directly from the opposite side of the sheet,
   detecting on said opposite side of said sheet both said directly emitted radiation and said reflected radiation transmitted through said sheet, and
   generating a signal according to the radiation detected which is a function of the temperature of said sheet and substantially independent of thickness variations in said sheet.

2. In a process for producing a traveling sheet of thin dielectric material having a thickness such that it constitutes less than an infinite radiator of the infrared radiation emitted according to the sheet temperature and which sheet transmits thermal background radiation incident on its one side through to its opposite side, the method of measuring the temperature of said sheet utilizing the infrared radiation emitted from both sides in a manner substantially independent of variations in sheet thickness and said transmitted thermal background radiation, said method comprising:
   shielding a portion of said sheet on said one side from said thermal background radiations,
   reflecting infrared radiations emitted from said portion on said one side back through said sheet portion to combine with infrared radiation emitted directly from the opposite side of said sheet portion,
   detecting on said opposite side of said sheet portion both said directly emitted radiation and said reflected radiation transmitted through said sheet portion, and
   generating a signal according to the radiation detected which is a function of the temperature of said sheet and substantially independent of said thermal background radiations and thickness variations in said sheet.

3. Apparatus for measuring the temperature of traveling sheet of thin dielectric material having a thickness such that it constitutes less than an infinite radiator of the infrared radiation emitted according to the sheet temperature, said sheet also constituting less than an infinite absorber for thermal background radiations incident on the sheet, said apparatus comprising:
   an infrared radiation sensor adapted to be positioned on one side of said sheet, said sensor being responsive to infrared radiations emitted from said one side of said sheet, and normally responsive also to said thermal background radiations,
   means adapted to be positioned on the other side of said sheet opposite said sensor for receiving radiation emitted from said other side and for reflecting said radiation emitted from said other side back through said sheet to said sensor, said means also shielding said sensor from thermal background radiations incident on said other side of said sheet which would otherwise penetrate said sheet and induce a spurious response from said sensor,
   a traversing gauge mount, said gauge mount including:
      means for supporting said infrared radiation sensor on said one side of said sheet and for supporting said receiving, reflecting and shielding means on said other side of said sheet opposite said sensor,
      said gauge mount further including means for traversing said sensor and said receiving reflecting and shielding means back and forth across the width of said sheet, and
   means connected to said sensor for generating a signal which is a function of temperature changes in said material substantially independent of changes in the thickness of the material and the lateral position of said sensor across the width of said sheet.

4. Apparatus as in claim 3 wherein said receiving reflecting and shielding means comprises a reflecting member which is opaque to said thermal background radiation, said member having a surface of low emissivity and high reflectance for said infrared raditions on that side of the member which is adjacent to said sheet portion.

5. Apparatus as in claim 4 wherein said surface of said reflecting member consists of oxidized aluminum.

6. Apparatus as in claim 3 wherein said receiving, reflecting and shielding means comprises a reflector plate of oxidized aluminum.

7. Apparatus for measuring a property of a traveling sheet of thin dielectric material having a thickness such that it constitutes less than an infinite radiator of the infrared radiations emitted by said material according to said temperature, said sheet also constituting less than an infinite absorber for thermal background radiations incident on the sheet, said apparatus comprising:
   a dielectric gauge including a probe having a pair of spaced electrodes adapted to produce an electric field in a measured portion of said sheet,
   an infrared radiation sensor adapted to be positioned on one side of said sheet, said sensor being responsive to infrared radiations emitted from said one side of said sheet, and normally responsive also to said thermal background radiations,
   means adapted to be positioned on the other side of said sheet opposite said sensor for receiving radiation emitted from said other side and for reflecting said radiation emitted from said other side back through said sheet to said sensor, said means also shielding said sensor from thermal background radiations incident on said other side of said sheet which would otherwise penetrate said sheet and induce a spurious response from said sensor,
   a traversing gauge mount for supporting said dielectric gauge probe,
      said gauge mount including means for supporting said infrared radiation sensor on said one side of said sheet and for supporting said receiving, reflecting and shielding means on said other side of said sheet opposite said sensor, said gauge mount further including means for traversing said probe, said sensor and said rectraversing said probe, said sensor and said receiving, reflecting and shielding means back and forth across the width of said sheet, means connected to said probe for producing a dielectric gauge signal which is a function of said dielectric property, and means connected to said sensor for compensating said dielectric gauge signal for temperature changes in said material in a manner substantially independent of changes in the thickness of the material and the lateral position of said sensor across the width of said sheet.

8. Apparatus as in claim 7 wherein said receiving, reflecting and shielding means comprises a reflecting member which is opaque to said thermal background radiations, said member having a surface of low emissivity and high reflectance for said infrared radiations on that side of the member which is adjacent to said sheet portion.

9. Apparatus as in claim 8 wherein said surface of said reflecting member consists of oxidized aluminum.

10. Apparatus as in claim 7 wherein said receiving, reflecting and shielding means comprises a reflector plate of oxidized aluminum.

References Cited

B. Bernard: "Determining Emissivity in Instruments and Control Systems," 37(5), pp. 87–89, May 1964.

LOUIS R. PRINCE, Primary Examiner

F. SHOON, Assistant Examiner

U.S. Cl. X.R.

73—73, 344, 355